June 13, 1950 L. D. EPPERSON 2,511,499
HYDRAULIC CONTROL APPARATUS
Filed Feb. 8, 1946 5 Sheets-Sheet 4
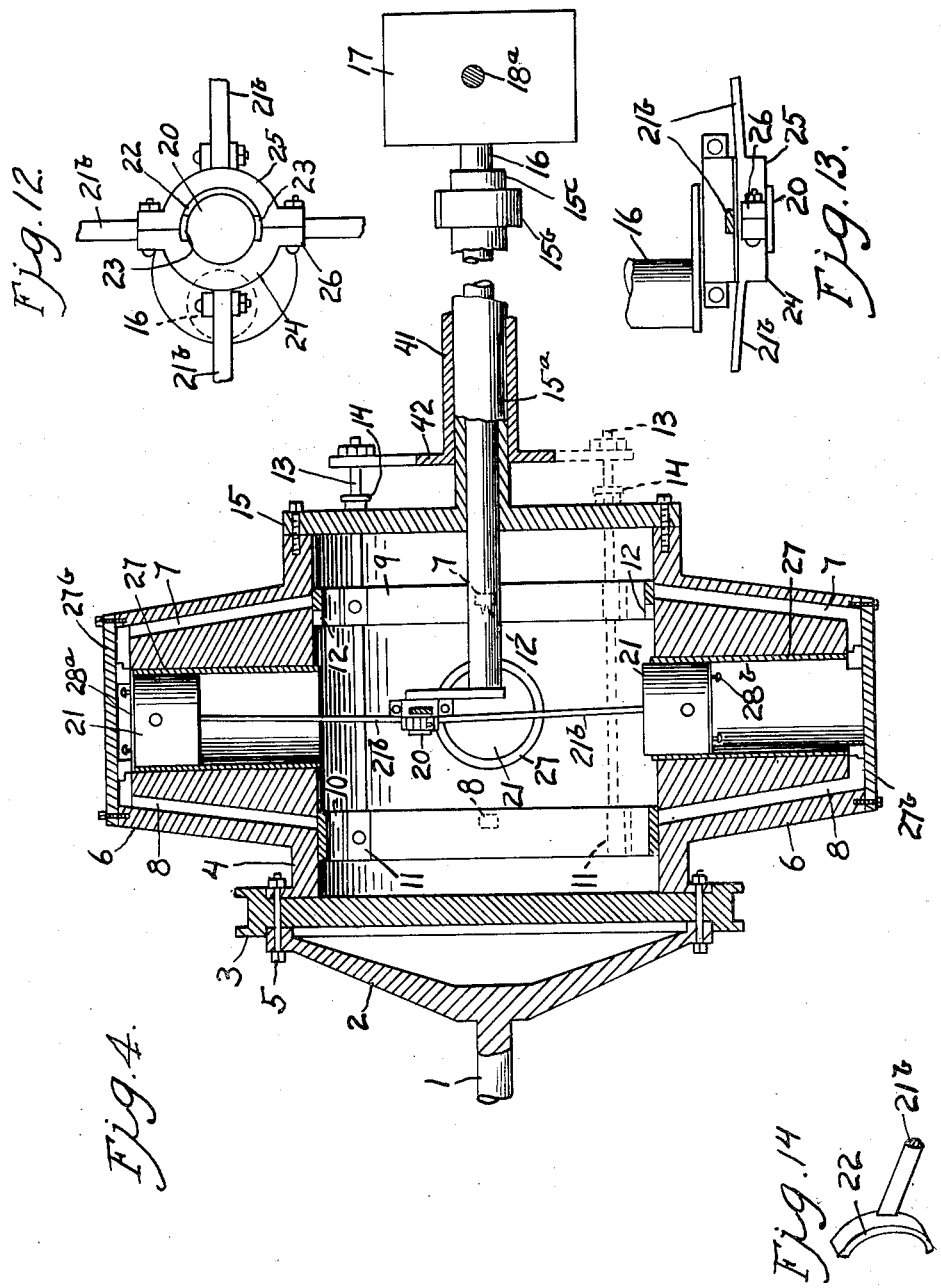
Inventor
Landy D. Epperson
By George Y. Thorpe
atty.

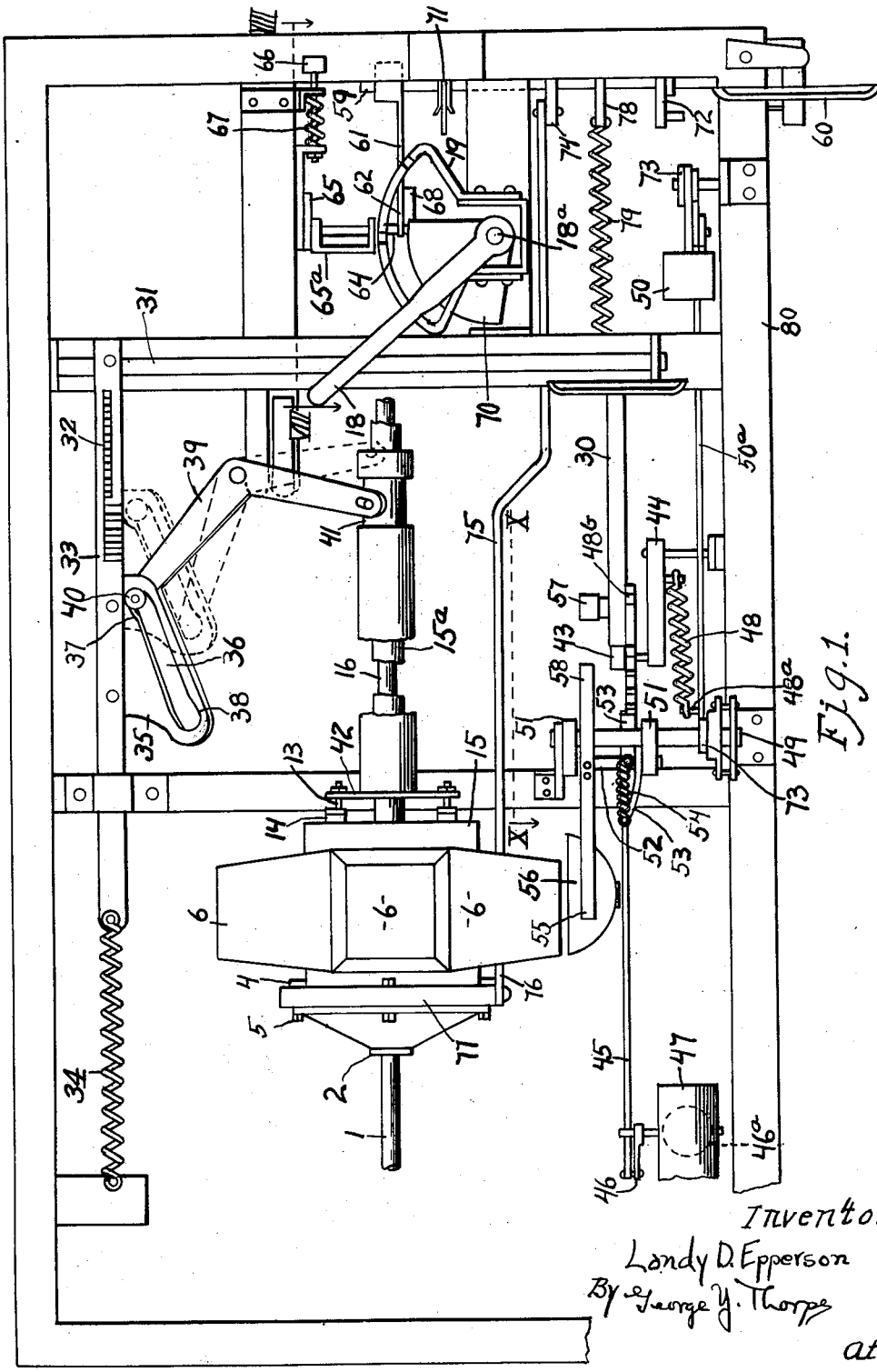

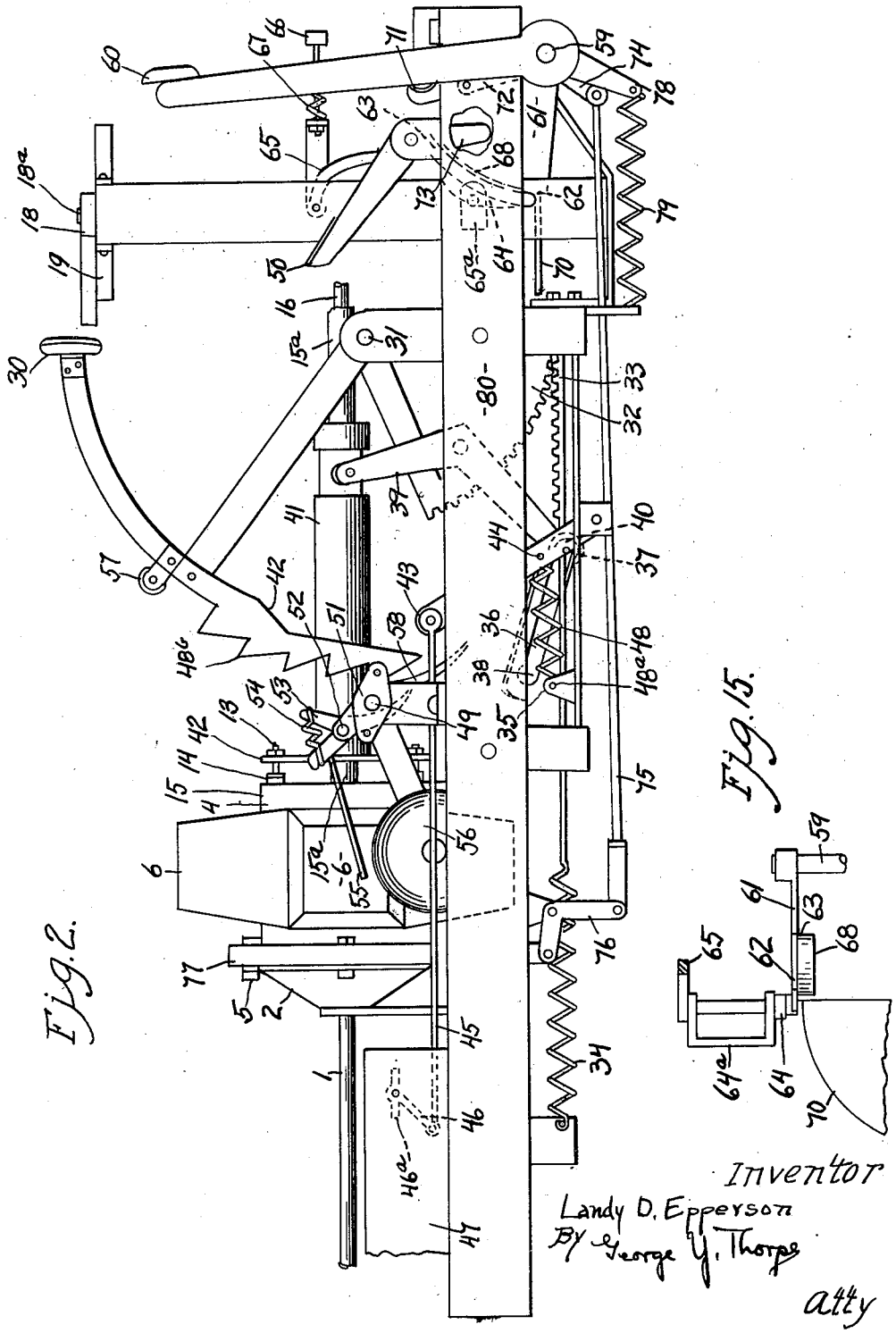

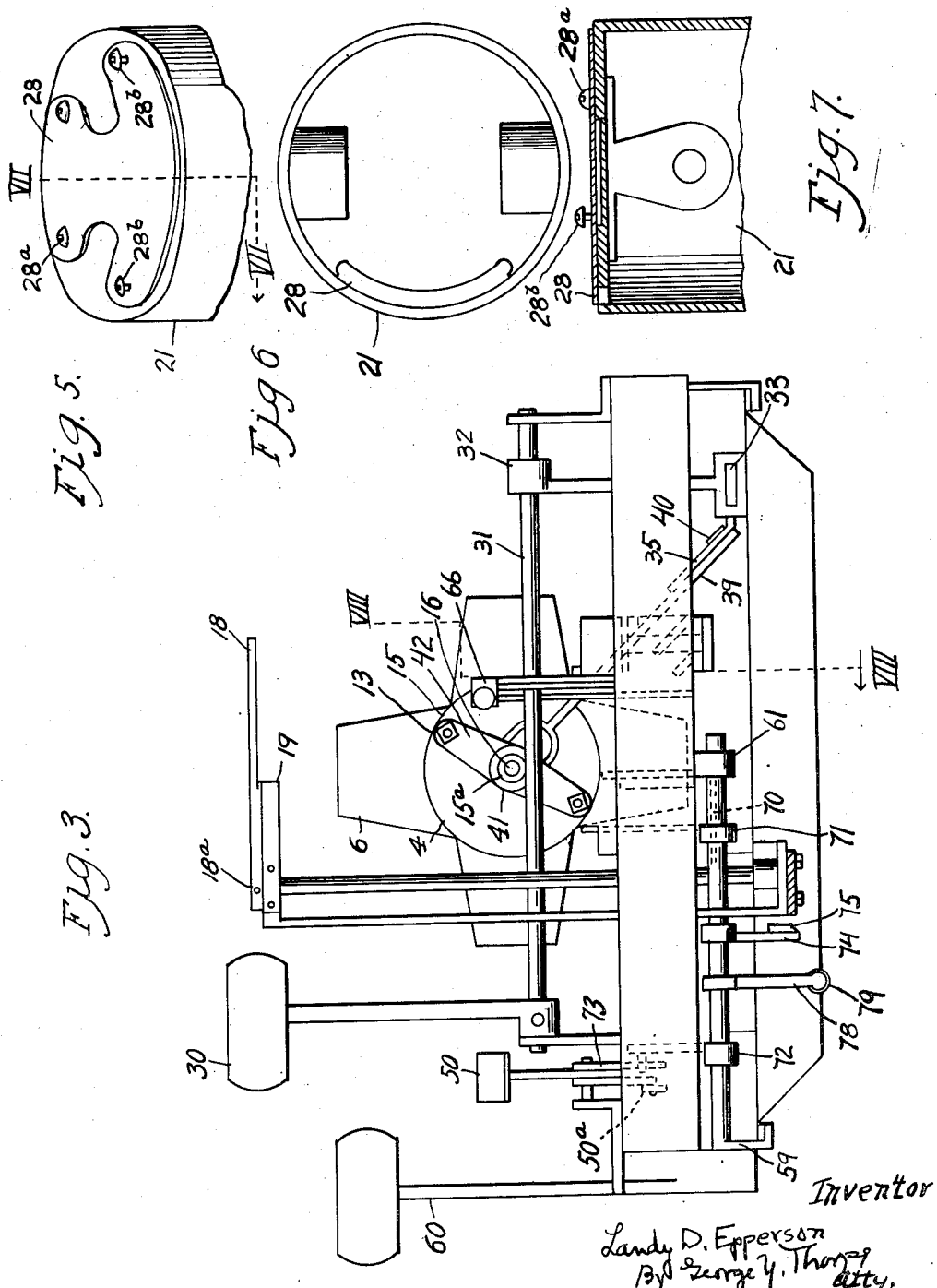

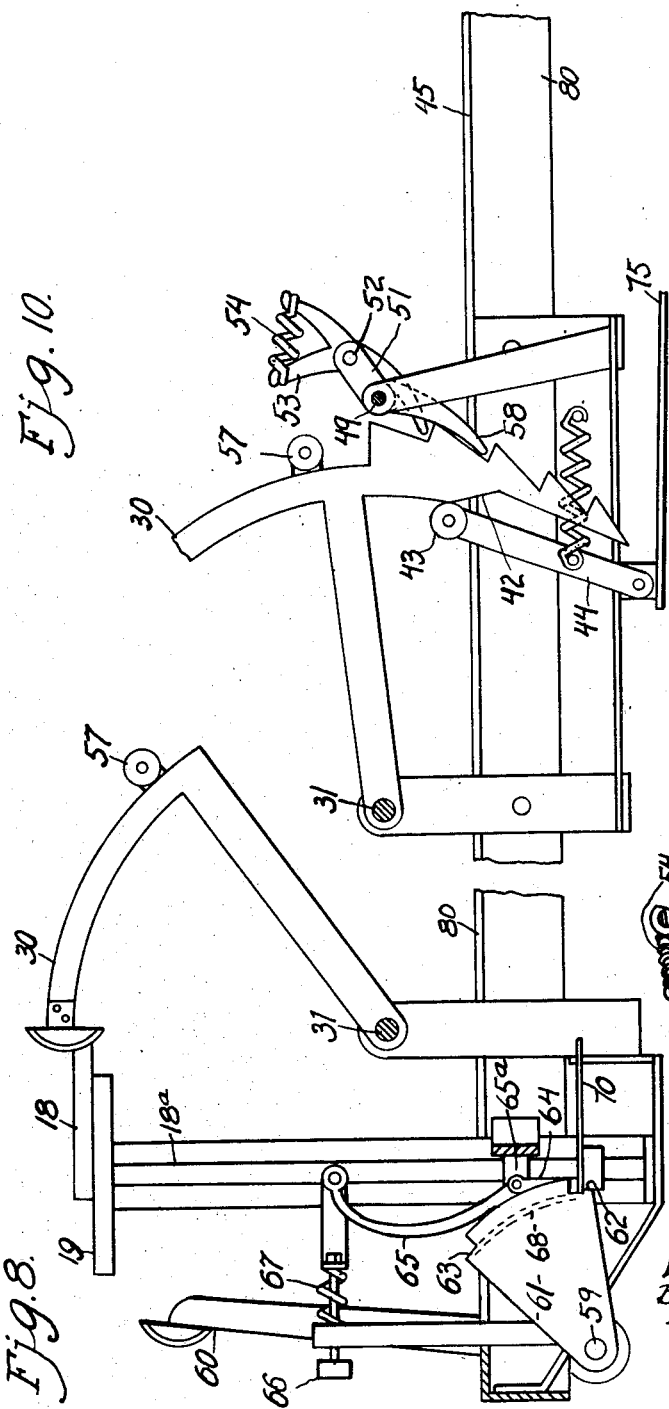

Patented June 13, 1950

2,511,499

UNITED STATES PATENT OFFICE 2,511,499

HYDRAULIC CONTROL APPARATUS

Landy D. Epperson, Kansas City, Mo.

Application February 8, 1946, Serial No. 646,285

8 Claims. (Cl. 192—.09)

This invention relates to hydraulic control apparatus or fluid pressure transmission and differential drives for internal combustion power plants and the like, and is particularly designed for the driving of motor cars. One of the objects of the invention is to produce a drive of the general character described which provides practically an infinite range of differential speeds between the power plant and the wheels or mechanism being driven.

Another object of the invention is to provide control mechanism of such nature that practically all essential operations may be regulated and controlled by the manipulation of a single master control pedal.

A further object is to provide means whereby the master control pedal may be locked in position to maintain a predetermined or desired speed differential between the driven and driving shafts to relieve the operator of the necessity of manually maintaining the master pedal in the desired position.

A still further object is to provide control apparatus which may be a pedal or lever of such character that the driving element, the engine, may be locked against movement so that the fluid clutch and drive mechanism may be employed as a means to safely descend hills, the power developed by the coasting vehicle reversely circulating the fluid as compared to normal operation. This descending pedal or lever may be locked in operative or inoperative positions as will hereinafter be described.

Another object of the invention is to produce control means for motor car use which obviates the necessity of employing the customary three forward speed gearing ratios, the car of the invention being equipped only with one forward, neutral and reverse gearing, all intermediate speed ratios being controlled by the master pedal.

A still further object of the invention is to produce a fluid or hydraulic control apparatus of such nature that loss of fluid in front of the pistons arising from leakage of any character is compensated for by a special wafer valve in the piston heads.

A further object of the invention is to produce a piston connecting rod and crank shaft bearing of such design as to permit aligned opposed cylinders for the through boring and reaming of said cylinders with a single machine tool set-up. This arrangement also brings the ports, both regulating and relief, in perfect radial alignment for control by certain sleeve valves hereinafter identified.

With the general objects named in view and others as will hereinafter appear, the invention consists in certain novel and useful features of construction and organization of parts as hereinafter described and claimed; and in order that it may be fully understood, reference is to be had to the accompanying drawings, in which:

Figure 1 is a top plan view of an hydraulic control apparatus embodying the invention with the reverse, forward and neutral gear box.

Figure 2 is a side elevation of the hydraulic control apparatus.

Figure 3 is a front end elevation of the apparatus with certain parts in the background omitted for clearness.

Figure 4 is an enlarged vertical longitudinal section through the control casing and certain control valves and pistons thereof.

Figure 5 is a fragmental perspective view of a piston.

Figure 6 is an inverted plan view of the piston.

Figure 7 is a section on the line VII—VII of Figure 5.

Figure 8 is a fragmental vertical section on the line VIII—VIII of Figures 1 and 3.

Figure 9 is a detail perspective view of certain parts appearing in Figure 10.

Figure 10 is a fragmental vertical section on the line X—X of Figure 1, the master control pedal being locked "down" or depressed.

Figure 11 is an elevational view of the ring valves of the hydraulic casing.

Figure 12 is an enlarged side view of the piston bearing connections for the crank shaft.

Figure 13 is an edge view of the construction shown in Figure 12.

Figure 14 is a detail perspective view of a fragment of one member of the connecting rod bearing.

Figure 15 is a fragmentary top plan view of certain cam locking mechanism to prevent accidental locking of the master pedal in depressed position or accidental gear shifting during grade descent of the car.

In the said drawings, where like reference characters identify corresponding parts in all of the figures, 1 is the end of an engine crank shaft terminating in a large flange 2. The flange 2 abuts a brake drum 3 forming the head of an oil chamber or master hydraulic casing 4, the parts being held in leak-proof relation by means of clamping bolts 5. The casing 4 is formed integrally, by preference, with a plurality of outwardly radiating piston cylinders 6 arranged in opposite pairs in balanced relation around the casing 4.

The inner end of each cylinder 6 opens into the master casing 4, and the outer or head end is connected by a pair of ports or passageways 7 and 8 with the master casing 4 at points spaced on opposite sides of the inner ends of the cylinders. The inner ends of the ports or passageways 7 and 8 are respectively controlled by master sleeve or ring valves 9 and 10, the former being a regulating and the latter a relief valve, illustrated as in the form of a pair of bands connected to move in unison by rods 11, which are offset inwardly so they do not contact or drag on the inner wall of the casing 4.

The master valves 9 and 10 control the circulation of oil or hydraulic fluid as will hereinafter appear, the valve 9 preferably having a corrugated or irregular opening edge 12 for each port 7, to give a more gradual opening and closing of the ports, while the valve 10 is so positioned with relation to the valve 9, that it does not commence to open until the ports 7 have been practically fully opened as will hereinafter more particularly appear. Connected to the valve 9 is a pair of rods 13 which extend through packing glands 14 carried by the head 15 of the casing 4.

The head 15 is formed with a projecting sleeve extension bearing 15a in which the transmission crank shaft 16 is journaled. The sleeve 15a is journaled in a bearing 15b carried by the car frame, it being understood that this sleeve always rotates at engine speed, while the shaft 16 journaled in the sleeve rotates at a differential speed depending upon the circulation of the fluid within the casing 4 as hereinafter described. The shaft 16 projects through a stuffing box 15c carried by the end of the sleeve bearing 15a, and enters a gear box 17, shown in outline only, Figure 1, containing forward, neutral and reverse gearing of any conventional or preferred form. The position of the gearing is manually controlled by a lever 18 mounted on a shaft 18a, said lever operating over an indicating quadrant through forward, reverse and neutral positions.

The end of the transmission shaft 16 within the casing 4 is formed with a crank pin 20 on which connecting rod bearings (Figures 12, 13 and 14) for the pairs of pistons 21 reciprocating in the cylinders 6, are journaled, said bearings, by preference, comprising bearing surfaces projecting to one side of each rod 21b in pairs, one bearing surface 22 being relatively thin and being adapted to contact the crank pin and to oscillate within a space 23 formed between a heavier bearing member 24 contacting the other side of the crank pin, the assembly being completed by a bearing cap 25 held to the bearing member 24 by means of clamp bolts 26. By this arrangement of parts it is possible to place each pair of cylinders in diametrically opposite alignment, making it possible to use a single machine set-up for the boring and reaming of each pair of cylinders 6 for the reception of replaceable cylinder liners or sleeves 27 each of which has a flange 27a fitting in an offset portion in the outer ends of the cylinders 6 (see Figure 4). The sleeves are held in position and the outer ends of the cylinders are closed by cover plates 27b, suitable gaskets not shown, being positioned between the cover plate and the cylinder ends and under the flanges 27a to seal the parts against leakage.

In order to permit oil or fluid to flow from the master casing 4 into the heads of the cylinder 6 should there be a tendency to form a vacuum in front of the pistons 21, each piston head is equipped with a disc or wafer valve 28a of spring material of light weight providing means permitting oil to pass to the head of the cylinder upon inward strokes of the pistons. A pair of stop pins 28b limit the opening movement of the wafer valves.

Assuming the master casing 4, cylinders 6 and passageways 7 and 8 are standing filled with oil poured through a suitable filling opening (not shown) formed in the casing 4, it will be evident that if control valve 9 and relief valve 10 are closed and the engine is in operation, no oil will be circulated by the pistons 21 since they will be locked against movement, consequently transmission shaft 16 will be rotated at the same speed as the engine shaft 1. The normal circulation of fluid occurs under the following conditions: Assuming the passageways 7 and 8 are partially open through the partial opening of the ring valve 9, but an insufficient distance to allow the head of the cylinder to fill with oil from passageway 7, the wafer valve in the head of the inwardly moving piston will open to allow oil to replace the vacuous condition formed in front of the piston. On the outward movement of the piston it will be apparent that the outflow of oil is regulated by the valve 9, this rate of oil escape determining the differential speeds of the driving and driven shafts.

Assuming that the valves 9 and 10 are fully open and the parts are so designed that there is relatively unrestricted flow or circulation of oil, it will be evident that the engine shaft 1 will rotate freely and no other torque will be applied to the transmission shaft 16 except that due to oil drag, which can be overcome by a very light brake pressure. It is to be noted that the entire casing 4 rotates at engine speed, but the speed of the transmission shaft 16 journaled within the extension bearing 15a of casing 4, travels at differential speeds depending upon the position of the valve 9.

To adapt the above transmission to motor car operation, the following control mechanism is provided: 30 is a master control pedal mounted in the driver's compartment, not shown, on a cross shaft 31 which is equipped with a toothed quadrant 32 enmeshed with a slidable rack bar 33, said rack bar and pedal being returned to normal or "up" position by means of a retractile spring 34. Secured to the rack bar 33 is a cam plate 35 having a relatively long straight cam track 36 so that the stroke of the control pedal 30 can be made as long as possible for the more accurate regulation of the speed ratios of the driving and driven shafts, said cam track terminating at its opposite ends in a pair of relatively steep lobes 37 and 38. Pivoted on the car frame is a bellcrank lever 39 having a roller cam-follower 40 received within the cam track 36. The other arm of the bell-crank lever is forked and pivotally receives a sleeve 41 which is journaled and slidably mounted on extension sleeve 15a of casing head 15, said member 41 being connected to a plate 42 fixed to the ends of the master valve operating rods 13. The arrangement is such that as the master foot pedal 30 is depressed, the first action causes the quadrant 32 to move cam plate 35, and this causes cam lobe 37 to operate lever 39 and sleeve 41 to operate valves 9 and 10 to take the "lap" (overlap) out of the valve 9 and bring its operating edge 12 into quick proximity to the port 7, after which the follower 40 gradually moving in the cam track 36 effects corresponding gradual movement of the control valves until the cam follower is actuated by the lobe 38 to quickly fully open the relief valve 10. Full open movement of valves 9 and 10 disconnects shafts 1 and 16, the latter only receiving the slight torque of the oil drag in surging back and forth within the casing 4, as heretofore mentioned.

When this occurs, the casing 4 and all parts carried thereby rotate at engine speed while the transmission shaft 16 does not rotate. It will thus be evident that in the downward progression of the master pedal 30, there is a proportionate decrease in speed of the transmission shaft 16 in relation to the engine shaft 1, until rotation of the former ceases. By this means the flow of power from the engine to the transmission shaft is under constant control and may be modified under manual manipulation of the master pedal 30 as required to maintain movement of the vehicle. Of course, on straight-away driving, where the power of the engine is sufficient to operate the transmission shaft at engine shaft speed, the operator may remove his foot from the master control pedal 30 and control the speed of the car through the customary throttle feed, not shown.

In order to prevent racing or overspeeding of the engine when the control valves 9 and 10 are fully open, in case the car operator fails to close the normal throttle feed valve, the master control pedal 30 is provided with a cam surface 42 which is positioned in timed relation to the lobe 38 of cam plate 35, so that as said lobe fully opens the relief valve 10, the cam surface 42 strikes a follower 43 on a lever 44, mounted on the car frame and connected by a rod 45 to a lever 46 of a butter-fly valve 46a mounted in the air intake 47 of the carburetor adjacent the usual throttle control valve, not shown. This safety butter-fly valve is in addition to the usual throttle valve and it normally stands fully open under the tension of a spring 48 connected to a bracket 48a carried by the car frame so that it does not interfere with normal throttle operation, but is swung to closed position when the follower 40 rides on the cam lobe 38, and thus prevents racing of the engine by shutting off the fuel supply except such supply as is necessary for the idling of the engine.

Under some road conditions as when climbing a hill, pulling through mud, hauling a heavy load, etc., the power of the engine may be insufficient to turn the transmission shaft at engine shaft speed. Therefore, in order to maintain driving connections through the hydraulic drive and relieve the operator of the necessity of holding the master control pedal 30 depressed to the desired extent, the following mechanism is provided to lock said pedal down to maintain the desired power ratio. This mechanism is provided by forming the master pedal with a toothed extension 48b. Frictionally journaled on the frame adjacent the toothed extension is a rock shaft 49 which may be oscillated through rod 50a actuated by downward movement of a speed reduction pedal 50 mounted within the driver's compartment, said pedal 50 being moved downwardly by the operator and staying down until returned to "up" or normal position, as will hereinafter appear. The rock shaft 49 carries a pair of arms 51 in which a second rock shaft 52 is journaled, said shaft 52 carrying a swinging pawl 53 which is normally held in advanced position by a spring 54.

When the rock shaft 49 is operated by depression of the pedal 50, the end of the pawl 53 is swung into the path of travel of the toothed extension 48b on the master pedal 30, so that as said pawl clicks from tooth to tooth and locks the master pedal in various positions in its downward travel, the jumping or engagement of the pawl from one tooth to the next oscillates the shaft 52 and causes a spring hammer 55 keyed thereto to intermittently strike an audible signal, such as a gong 56. As many teeth 48b may be provided as desired, each tooth progressively indicating the transmission of a lower speed and consequently increased power from the engine shaft 1 to the transmission shaft 16. To return the speed reduction pedal 50 to normal position, complete depression of the master pedal 30 causes contact of a follower 57 on the master control pedal with a cam member 58 keyed to the shaft 49, to return the pedal 50 to normal position by rocking said shaft 49 so that the pawl 53 is moved out of the path of travel of the teeth 48b on master pedal 30.

In order to provide hill or grade descending means with the engine stopped to utilize the restricted flow or circulation of oil as a brake, the following mechanism is provided: Journaled at any suitable point in the car frame is a rock shaft 59 to which a descending pedal or lever 60 is keyed, said pedal or lever being positioned conveniently for operation by the driver of the car. Inasmuch as it is proposed to descend hills with the engine stopped and locked against rotation, speed of descent being controlled solely through manipulation of the master control pedal 30, it is apparent that means must be provided to safety lock against possibility of the pawl 53 locking the master pedal 30, and to also lock against the accidental shifting of the gears from forward to neutral or reverse. In order to accomplish this, an interlock, comprising a segmental plate 61 is keyed to the rock shaft 59, said plate having end shoulders 62 and 63, which respectively lock the descending pedal in "up" (inoperative) or "down" (operative) positions, by contact with a latch member 64, which forms one arm of a bell-crank lever 65 journaled on a fixed support bracket 65a, for operation by a pull arm 66 adjacent the driver's seat. The bell-crank lever 65 is normally held in the path of travel of the segment 61 by a spring 67.

In addition to the end shoulders 62 and 63 on the segmental plate 61, said plate is provided with an arcuate stop 68 which intersects the course of travel of a segmental stop arm 70 on the gear shift lever shaft 18a so that said lever can be operated only when the descending pedal 60 is in "up" or inoperative position. The shaft 59 carrying the descending pedal 60 also carries a master ignition control switch arm 71 so that the engine ignition is cut off in all positions of the descending pedal 60 except in its "up" or inoperative position. A third arm or cam 72 is mounted on the rock shaft 59 which, by contact with an extension ear 73 on the shaft of the speed reduction pedal 50 forms an interlock and prevents the possible depression of pedal 50 when the pedal 60 is in down position. This prevents possible engagement of locking pawl 53 with the teeth 48b which would hold the master pedal 30 in depressed or partially depressed position and might cause the driver to lose control of the car on descending a grade.

In addition to the foregoing, the rock shaft 59 is equipped with a lever arm 74 which is connected by a rod 75 to a bell-crank lever 76, the other arm of said bell-crank lever being connected to one end of a brake band 77 encircling the brake drum 3. This brake arrangement is provided to insure holding the engine against rotation by locking the casing 4 against movement under the tendency of the transmission shaft 16 to apply torque to rotate the casing 4 in descending operation. When the descending pedal or lever 60 is depressed, it will be apparent that that first action is to break the ignition by opening the switch 71 and to apply the locking brake 77 to the brake drum 3 to hold the engine against rotation. From this point on, the descending speed is regulated through partially opening and closing valves 9 and 10 through manipulation of the master control pedal 30. Shaft 59 also has an arm 78 connected by a retractile spring 79 to a fixed part of the car frame 80, to reelevate pedal 60 and fully relieve braking pressure applied by the brake band 77.

From the above description it will be apparent that I have produced an apparatus embodying the invention which possesses all of the features of advantage set forth as desirable, and while I have described and illustrated the preferred embodiment, it is to be understood that I reserve the right to all changes within the spirit and scope of the appended claims.

I claim:

1. In power apparatus, the combination of a driving shaft, a driven shaft, a clutch mechanism for connecting said shafts, said mechanism comprising a fluid containing casing secured to one of said shafts, a cylinder carrier by the casing and having its opposite ends in communication therewith at spaced points, a master valve for opening and closing communication between one end of the cylinder and the casing, a piston connected to the other shaft and mounted for reciprocation in the cylinder, a valve in the piston head, means for locking the master valve in predetermined positions of adjustment, means to lock the casing against rotation, and an interlock between the casing locking means and the master valve locking means to prevent activation of the latter when the former is operative.

2. The combination in motor car driving apparatus of a driving shaft, a driven shaft, a clutch mechanism connecting said shafts, said mechanism comprising a fluid containing casing secured to one of said shafts, a piston connected to the other shaft and mounted for reciprocation in the cylinder, gear shifting means for connecting one of the shafts to the wheels of the car in forward or reverse positions, means for locking the casing against rotation on hill descending, and an interlock between said casing locking means and gear shifting means insuring that the latter shall be in forward position when the former is operative.

3. The combination in a motor car driving apparatus of a driving shaft, a driven shaft, a clutch mechanism connecting said shafts, said mechanism comprising a fluid containing casing secured to one of said shafts, a piston connected to the other shaft and mounted for reciprocation in the cylinder, gear shifting means for connecting one of the shafts to the wheels of the car in forward or reverse positions, means for locking the casing against rotation on hill descending, an interlock between said casing locking means and gear shift means insuring that the latter shall be in forward position when the former is operative, and an ignition control switch opened by operative positioning of the casing locking means to break the car ignition.

4. The combination in motor car driving apparatus of a driving shaft, a driven shaft, a clutch mechanism connecting said shafts, said mechanism comprising a fluid containing casing secured to one of said shafts, a piston connected to the other shaft and mounted for reciprocation in the cylinder, gear shifting means for connecting one of the shafts to the wheels of the car in forward, or reverse positions, means for locking the casing against rotation on hill descending, an interlock between said casing locking means and gear shift means insuring that the latter shall be in forward position when the former is operative, and manually operable means to lock the casing locking means in either operative or inoperative positions.

5. In power apparatus, the combination of a driving shaft, a driven shaft, a clutch mechanism for connecting said shafts, said mechanism comprising a fluid containing casing secured to one of the shafts, a cylinder carried by the casing and having its opposite ends in communication therewith, a master valve for opening communication between one end of the cylinder and the casing, a piston connected to the other shaft and mounted for reciprocation in the cylinder, a wafer valve in the piston head for permitting fluid to pass from one side of the piston to the other, and means to lock the casing against rotation.

6. In power apparatus, the combination of a driving shaft, a driven shaft, a clutch mechanism for connecting said shafts, said mechanism comprising a fluid containing casing secured to one of the shafts, means to lock the casing against rotation, a pair of diametrically opposite cylinders carried by the casing and having their opposite ends in communication therewith at spaced points, a crank journaled in the casing, pistons for reciprocation in said cylinders, connecting rods between the crank and pistons, and a connecting rod bearing, said bearing comprising a unit assembly of independently oscillatory split bearings, each connecting to one of the piston rods.

7. In power apparatus, the combination of a driving shaft, a driven shaft, a clutch mechanism comprising a fluid containing casing secured to one shaft and having a pair of spaced ports, means to lock the casing against rotation, and a pair of spaced sleeve valves for successively closing or opening said ports, one of said valves having a V-shaped operating edge for gradually uncovering its respective port and for fully uncovering the same concurrently with the uncovering of the other port.

8. In power apparatus, the combination of a driving shaft, a driven shaft, a clutch mechanism for connecting said shafts, said mechanism comprising a fluid containing casing secured to one shaft, and having spaced ports, means to lock the casing against rotation, a piston having a port in its head and reciprocating in the cylinder and operatively connected to the drive shaft, a wafer valve secured to the head of the piston and adapted under pressure to yield and uncover the head port, a pair of connected sleeve valves within the casing for controlling the cylinder ports, manually operable cam mechanism, and means operable by said cam mechanism to simultaneously actuate the sleeve valves to open or close their respective ports.

LANDY D. EPPERSON.

REFERENCES CITED

The following references are of record in the file of this patent:

UNITED STATES PATENTS

| Number | Name | Date |
|---|---|---|
| 1,336,749 | Jessen | Apr. 13, 1920 |
| 2,025,472 | Perry | Dec. 24, 1935 |
| 2,107,344 | Rodeghier | Feb. 8, 1938 |
| 2,109,227 | Benson | Feb. 22, 1938 |
| 2,397,883 | Peterson et al. | Apr. 2, 1946 |
| 2,398,124 | Stowe | Apr. 9, 1946 |
| 2,420,996 | Price | May 20, 1947 |